(12) United States Patent
Galstian et al.

(10) Patent No.: US 7,376,327 B2
(45) Date of Patent: May 20, 2008

(54) OPTICAL DEVICE AND METHOD FOR THE SPECTRALLY-DESIGNED ATTENUATION OF A MULTI-WAVELENGTH LIGHT SIGNAL

(75) Inventors: Tigran Galstian, Ste-Foy (CA); Armen Zohrabyan, Quebec (CA); Amir Tork, Cap Rouge (CA); Rouslan Birabassov, Quebec (CA)

(73) Assignee: Photintech Inc., Sainte-Foy, Quebec (CA)

( * ) Notice: Subject to any disclaimer, the term of this patent is extended or adjusted under 35 U.S.C. 154(b) by 0 days.

(21) Appl. No.: 11/233,514

(22) Filed: Sep. 21, 2005

(65) Prior Publication Data

US 2006/0062518 A1 Mar. 23, 2006

Related U.S. Application Data

(60) Provisional application No. 60/614,440, filed on Sep. 21, 2004.

(51) Int. Cl.
*G02B 6/00* (2006.01)
(52) U.S. Cl. ..................................... 385/140
(58) Field of Classification Search .................. 385/14, 385/27, 39, 140, 144, 145
See application file for complete search history.

(56) References Cited

U.S. PATENT DOCUMENTS 6,208,798 B1 * 3/2001 Morozov et al. ........... 385/140
6,370,312 B1    4/2002 Wagoner et al.
6,489,399 B1   12/2002 Chan et al.

OTHER PUBLICATIONS

Monerie, Michel, "Propagation in Doubly Clad Single-Mode Fibers", IEEE Journal of Quantum Electronics, Apr. 1982, vol. QE-18, N4, pp. 535-542.
Morozov, Val, et al., "Fused Fiber Optic Variable Attenuator", published in OFC 2000 Proceedings, 4, pp. 22-24.

* cited by examiner

*Primary Examiner*—Sarah Song
(74) *Attorney, Agent, or Firm*—Darby & Darby P.C.

(57) ABSTRACT

A device and method for the spectrally-designed and controlled attenuation of a light signal, including an attenuation structure which may be placed in the proximity of a waveguide's core and which comprises a base material system containing non-uniformities having optical properties that are different from those of the host. These non-uniformities may have various natures, geometrical forms and sizes and may be created, doped or otherwise introduced in the base material system to obtain externally controllable optical properties of the whole composite material providing a broadband spectral performance.

29 Claims, 18 Drawing Sheets

OPTICAL DEVICE AND METHOD FOR THE SPECTRALLY-DESIGNED ATTENUATION OF A MULTI-WAVELENGTH LIGHT SIGNAL

FIELD OF THE INVENTION

The present invention relates to the field of optical devices and more particularly concerns the design and control of the spectral dependence of the attenuation of a multi-wavelength light signal.

BACKGROUND OF THE INVENTION

The energy budget and its dynamic balance are key issues to optimize the performance of agile optical telecommunication networks. This requires the use of variable optical attenuators (VOAs). At the same time, an optical telecommunication line needs more optical amplifiers if the optical losses of the network are high. It is therefore very important to choose optical components (e.g., VOAs) with minimal losses when they are used in their transparent state. The in-guide (or guided wave) modulation of light propagation (light remains in the original waveguide while being transformed) appears to be the best solution for the fabrication of low-loss optical components. The main underlying principle here is the use of the evanescent part of light to affect it dynamically.

The material issue appears to be inherently involved in the development of evanescent field devices since we must provide media that is able to dynamically alter the optical properties of the mentioned above guiding components. The traditional way to do this is the change of the optical properties of the cladding of the guide, particularly in the area where the evanescent field propagates. In the case of the VOA application, the materials used must have relatively high sensitivity to the external excitation (e.g., thermal) to provide sufficiently high refractive index changes (compared to the waveguide's core $n_{co}$ and cladding $n_{cl}$ refractive index$_{difference}$ $\Delta n$) generating thus corresponding light attenuation.

Composite materials, including polymers, liquid crystals, organic/inorganic compounds, etc., are good candidates to address this paramount problem. These materials often provide low-cost fabrication techniques and are easy to manipulate in comparison with complex and costly operations needed to fabricate semiconductor components or micro electro mechanical systems.

Significant efforts have been devoted in the past for the development of robust and reliable composite materials for applications in evanescent field devices. However, an important problem persists with these materials, which is related to their dispersion (refractive index dependence upon light wavelength: $n(\lambda)$). Namely, in FIG. 1a (PRIOR ART), the wavelength dependence (see solid line) of the effective refractive index $n_{eff}$ of a silica glass based fiber waveguide is schematically presented. The typical dispersion curve (see dashed line) of an original ("pure") polymer material is also presented in the same FIG. 1a. In the case of modulation of the refractive index of the polymer $n_p$ (for example, by changing the temperature T), the dashed line usually is shifted vertically while remaining parallel to its initial direction (this shift is not shown in FIG. 1a). When such a polymer is used as a part of waveguide's cladding, the light attenuation is achieved when we approach the situation $n_p(T) \geq n_{eff}(T)$, the maximum of attenuation being achieved for $n_p(T) = n_{co}(T)$. FIG. 1b is an experimental demonstration of such an attenuation transfer function.

However, it may be easily imagined that, because of the different slopes of the solid and dashed curves, the shorter ("blue") wavelengths of the guided light will suffer from different losses compared to longer ("red") wavelengths since the condition $n_p(T) = n_{eff}(T)$ is satisfied at different values of T for the "red" and "blue" light. This will create an undesired tilt in the attenuation dependence upon the wavelength, or so called, wavelength dependent loss (WDL). For a more precise example, the maximum attenuation for the 1600 nm light will require a value of T for which the attenuation of 1500 nm will be much less, generating thus an undesired spectral tilt of attenuation, which may be appreciated from FIG. 1c. The curves 1-4 correspond to different levels of attenuation. The curve 4, for example, corresponds to 18 dB attenuation level at 1550 nm and it is accompanied by almost 6 dB WDL. This correspondingly will introduce additional changes in the spectral characteristics of the transfer function of the module where the VOA is integrated. A critical example is the Erbium Doped Fiber Amplifier. The problem is particularly important when multiple channels (for example, in the conventional C band) are propagating in the same device. Then the dynamic adding or dropping of a part of those channels brings to significant power fluctuations. Then the power equilibrium must be re-established in a spectrally uniform way to avoid the degradation of the signal to noise ratio for all remaining channels having various wavelengths.

Various methods have been proposed in the past to avoid such wavelength dependence. One of them is the change of the device's wavelength dependence by modifying the waveguide's geometry, e.g., via tapering the fiber or using multiple cladding structures, keeping however the material composition of the guide unchanged. Such a method is described in the U.S. Pat. No. 6,370,312B1, (Gregory A. Wagoner, Kevin J. McCallion, Gary O. Jameson, all with MOEC) granted on Apr. 9, 2002, "Fiber Optic Attenuation Systems, Methods of Fabrication Thereof and Methods of Attenuation Using the Same". Another description of a similar solution may be found in the article, by Michel Monerie, "Propagation in Doubly Clad Single-Mode Fibers", IEEE Journal of Quantum Electronics, Vol. QE-18, N4, April 1982. A device with good WDL characteristics is described also in the article entitled "Fused fiber optic variable attenuator" published in OFC 2000 Proceedings, 4. pp. 22-24 by V. Morozov, H. Fan, L. Eldada, L. Yang, Y. Shi.

However, these approaches require a special waveguide design and fabrication, which is rather complicated and costly. Note that in all these approaches, the light propagates a "direct" waveguide, that is, the waveguide's axis is not deformed. As we shall disclose below, the use of a non-uniform composite material as a part of cladding or the deformation of that axes may decrease the wavelength dependence of attenuation.

Another solution has been proposed, which uses a standard guide, such as a SMF28 fiber, along with a polymer cladding of modified chemical composition and refractive index $n^*_p$ (see the dotted line in FIG. 1a). This composition contains absorbing (between the 1100-1200 nm range, see dashed line in FIG. 1d) organic dyes, which increase the dispersion tilt (solid line in FIG. 1d and dotted line in FIG. 1a) and provide a slope of $n^*_p(\lambda)$ that matches the $n_{eff}(\lambda)$ of the fundamental waveguide mode. In this case, the vertical shift of the curve representing the polymer's refractive index $n^*_p(\lambda)$ brings to the simultaneous satisfaction of the condition $n^*_p(T, \lambda) = n_{eff}(T, \lambda)$ for almost all channels (wavelengths) that are propagating in the fiber, and respectively, to the same attenuation due to the guided mode field diameter increase and further leakage. The U.S. Pat. No. 6,489,399 (K. P. Chan, D. G. Gascoyne, J. L. Krahn, G. A. Wagoner, all with MOEC) granted on Dec. 3, 2002, "Dye-appended polymers for broadband fiber optic devices", and the references therein describe the details of such approach.

This method seams to be an easier way (compared to the fabrication of guides with special geometry), however, key tradeoffs must be considered here also. First one is the problem of the chemical miscibility and stability of the organic dye-polymer composition. This is the reason why only very small fractions of weight percentages of a specific group of organic dyes may be introduced in the polymer matrix. Another problem is related to the fact that the limited group of known dyes, which offer the "flattening" capacity, is composed of big organic molecules. Such molecules are rather unstable from photochemical point of view, in particularly when using multiple cycles of thermal control. The third problem is related to the additional optical losses introduced by those dyes at working telecommunication wavelengths (1300-1600 nm). Finally the high cost of the dye and the difficulty of its uniform integration in the polymer matrix (without aggregation or precipitation) complete the list of drawbacks of this approach.

In summary, the methods described above remain complex, non-reliable and costly. An ideal spectrally broadband device would use standard and cost effective optical waveguides (such as SMF28), be simply controllable and provide spectrally uniform (covering many communication channels simultaneously) attenuation of the optical signal with minimal loss and maximal material stability.

In view of the above, it is obvious that there is a need for a technology apt to spectrally design and control the attenuation of a light signal. More precisely, there is a need for a specifically designed controllable component (including material and geometry) for the broadband attenuation of the guided light.

SUMMARY OF THE INVENTION

In accordance with a first aspect of the present invention, there is provided an optical device providing a spectrally-designed attenuation of a multi-wavelength light signal, said device comprising:

an optical waveguide having a light-guiding core for guiding said light signal and a cladding, a gap of predetermined shape being provided in said cladding along a portion of said waveguide; and an attenuation structure provided within said gap, said attenuation structure comprising:

a base material system having uniform optical properties; and a plurality of non-uniformities provided in said base material system, said non-uniformities having optical properties different from the optical properties of said base material system, said different optical properties of the base material system and non-uniformities generating wavelength dependent losses in said light signal.

In accordance with another aspect of the present invention, there is also provided a method for attenuating a multi-wavelength signal in a spectrally-designed fashion, comprising the step of providing an attenuation structure in an interacting relationship with said light signal, said attenuation structure comprising:

a base material system having uniform optical properties; and a plurality of non-uniformities provided in said base material system, said non-uniformities having optical properties different from the optical properties of said base material system, said different optical properties of the base material system and non-uniformities generating wavelength dependent losses in said light signal.

In a first embodiment of the invention, the principle of the present invention is applied to a VOA obtained by a simple cladding removing approach providing a design geometry of a standard linear optical waveguide (fiber, planar guide, etc.) with partially removed cladding that is replaced by a specific composite material mixture, which provides controllable optical loss improving the tilt of the wavelength dependent loss (the value of WDL).

This waveguide includes a cladding area, which is adiabatically removed with geometrical parameters (length, depth, slopes) that increase the attenuation range, reduce the insertion loss and the attenuation ripple due to multiple interference phenomena between core and cladding modes and their back coupling into the core in up tapered region of the removed cladding that is covered with a composite material mixture.

The material mixture in question includes:

a material of a single type or a mixture of materials of different types forming a relatively uniform "host" matrix; and at least one type of an additional component (e.g., spatial non uniformities, droplets or particles of various size and form), further called for the commodity as "guest" (but not necessarily being introduced from outside) and having optical properties, which are different from those of the host matrix.

The type of composite mixture according to the invention is particularly interesting in that it is capable of changing its optical properties (average refractive index distribution, contrast of the non-uniformity, etc.) upon an external controlling excitation changing thus the optical loss value of the guided wave in a spectrally predetermined way to obtain a broadband light attenuation. In fact, the components of this mixture are chosen in a way to spectrally equilibrate light losses generated due to the guided mode transformation, core-clad coupling or other types of "traditional" losses (usually higher for the "red" light when using "traditional" pure polymer materials) and by the losses originating from the non-uniformities generated by the guest particles. Namely, the material compositions of the host and of the guest, the size and density of the guest particles and the dependence of values of mentioned above material and geometrical parameters of the composite mixture upon the external excitation (e.g., temperature) may be chosen in a way to obtain the desired spectral dependence of losses, compensating or emphasizing its spectral dependence.

It should be noted that the choice of the guest particle's material composition, diameter and concentration may bring to the formation of optical non-uniformities of refractive index and/or absorption of the composite matrix, which in turn, may attenuate light via scattering, spatially non-uniform leakage and absorption, etc. with the desired spectral properties. For example, the so-called, Rayleigh scattering typically has $\lambda^{-4}$ wavelength dependence, which obviously would increase the losses for shorter wavelengths. In another example, the introduced non-uniformities may generate effective portions of the controllable cladding that may create "multiple" zones of VOA with similar but mutually shifted transfer functions (attenuation versus control parameter, e.g., temperature) flattening thus the corresponding spectral dependence of the integral device.

In the framework of application of the mixture in a VOA device, at least one compound of the mixture has a refractive index that may be controlled by an external excitation (e.g., temperature). One of the purposes of this control is essentially to change the average refractive index of the mixture $n_{av}$, serving as a part of the guide's (e.g. a SMF28 fiber) cladding, and shifting the $n_{av}$ across the effective refractive index $n_{eff}$ of the guide. This will change the mode diameter of the guide and bring to some "traditional" mode coupling, leakage and other kinds of losses that, as already mentioned above, may be stronger for longer ("red") wavelengths if only a linear waveguide and uniform material (with non-matched dispersion) are used. The second purpose of that control is the simultaneous control of scattering, non-uniformity and absorption losses based on the contrast of optical properties of the host material and of the guest particles (e.g., molecules, micelles, nano or micro structures, droplets, spheres, etc.) that provide additional spectrally dependent loss to compensate the "traditionally" higher losses at longer wavelengths.

Alternatively, the parameters of the guest compound and of the guide's geometry may be chosen in a way to generate higher losses for "red" wavelengths along with the increase of the $n_{av}$, which will even more accentuate the existing tilt in the WDL. That is why we shall further understand a "spectral control" (that may provide both positive and negative slopes) when speaking about the WDL improvement.

In another embodiment of the invention, specific geometrical transformations (fiber three-dimensional bent) are used to address the above-mentioned problems of spectral non-uniformities of attenuation by means of providing a specific bent form of the etched (or otherwise partially removed cladding) part of the waveguide.

Other aspects and advantages of the present invention will be apparent upon reading the following non-restrictive description of several preferred embodiments, made with reference to the accompanying drawings.

DETAILED DESCRIPTION OF PREFERRED EMBODIMENTS OF THE INVENTION

Figure 1A:
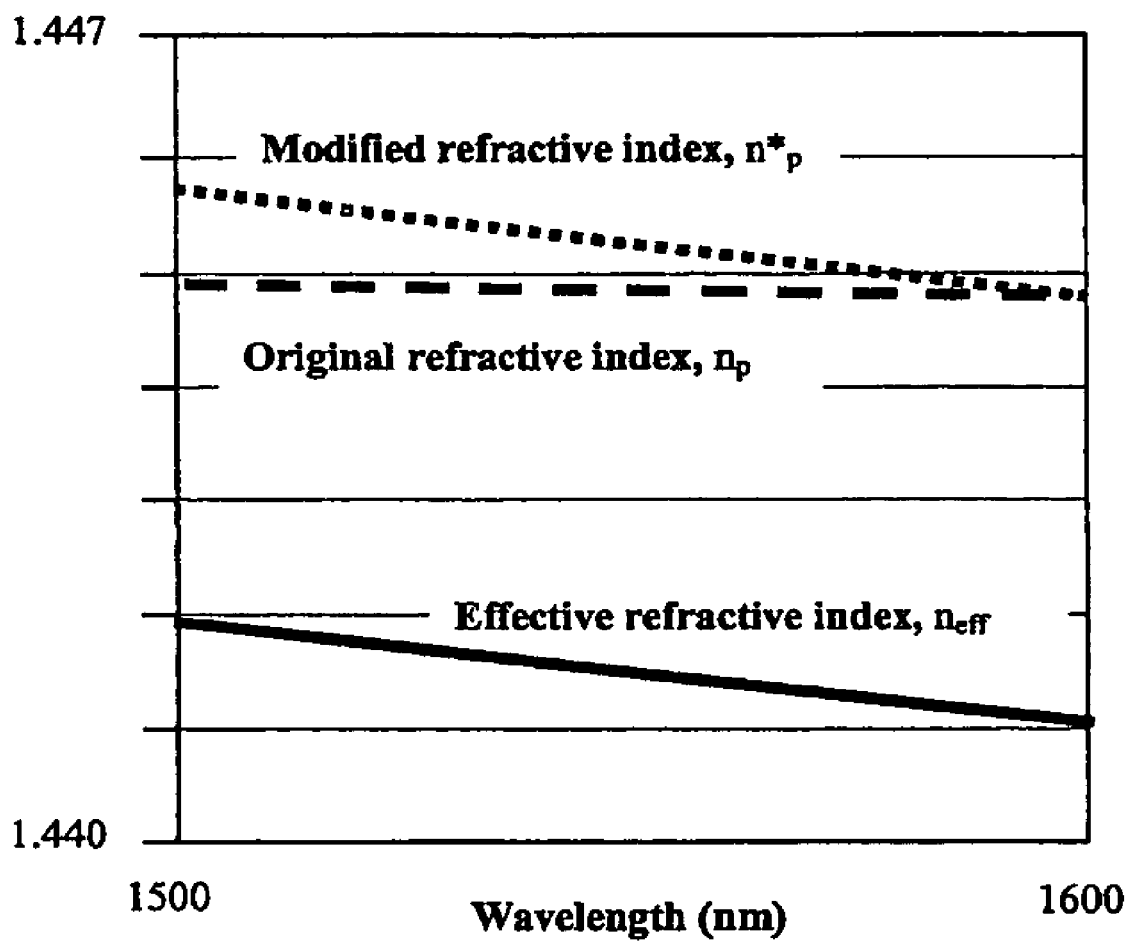
FIG. 1A (PRIOR ART), is a schematic representation of the refractive index dependences upon wavelength for a silica glass based fiber waveguide, for an "original" polymer and for a dispersion "corrected" polymer.
Figure 1B:
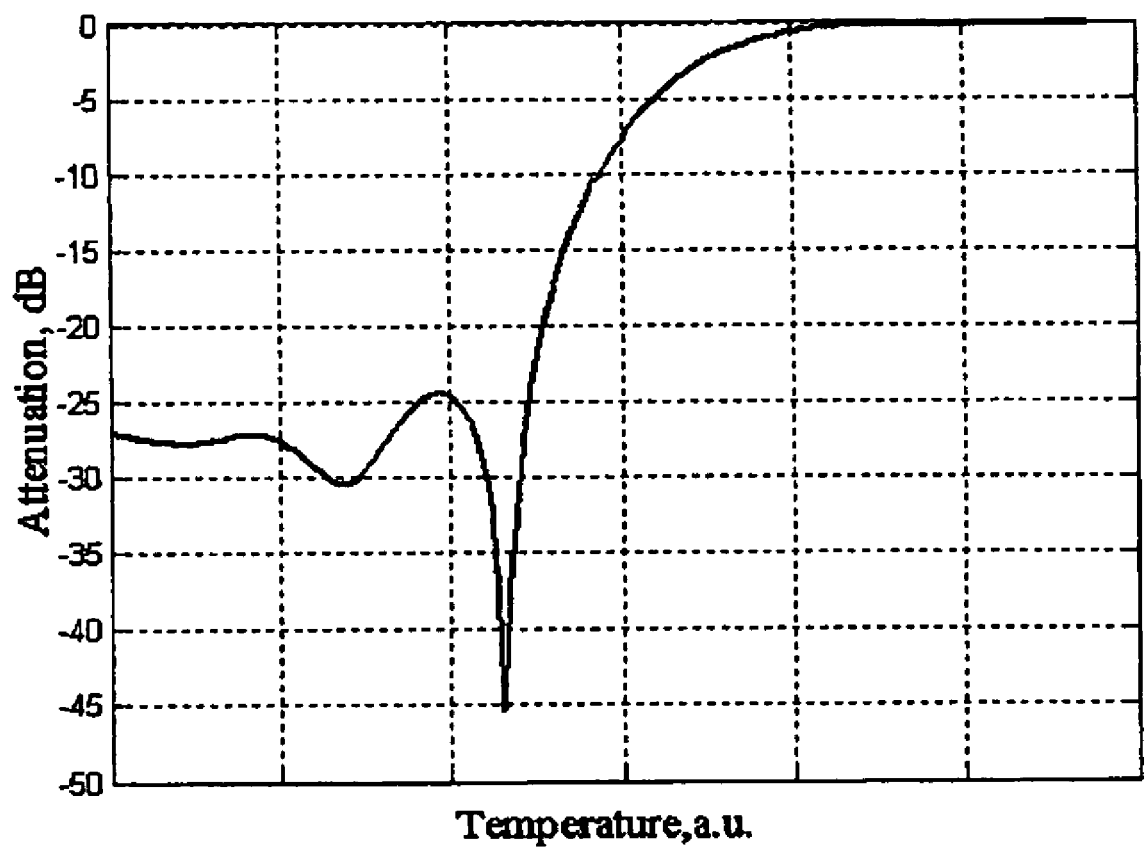
FIG. 1B (PRIOR ART), is an experimental demonstration of attenuation dependence upon temperature obtained in a guide with partially removed cladding that was replaced by a "pure" thermally controllable organic material.
Figure 1C:
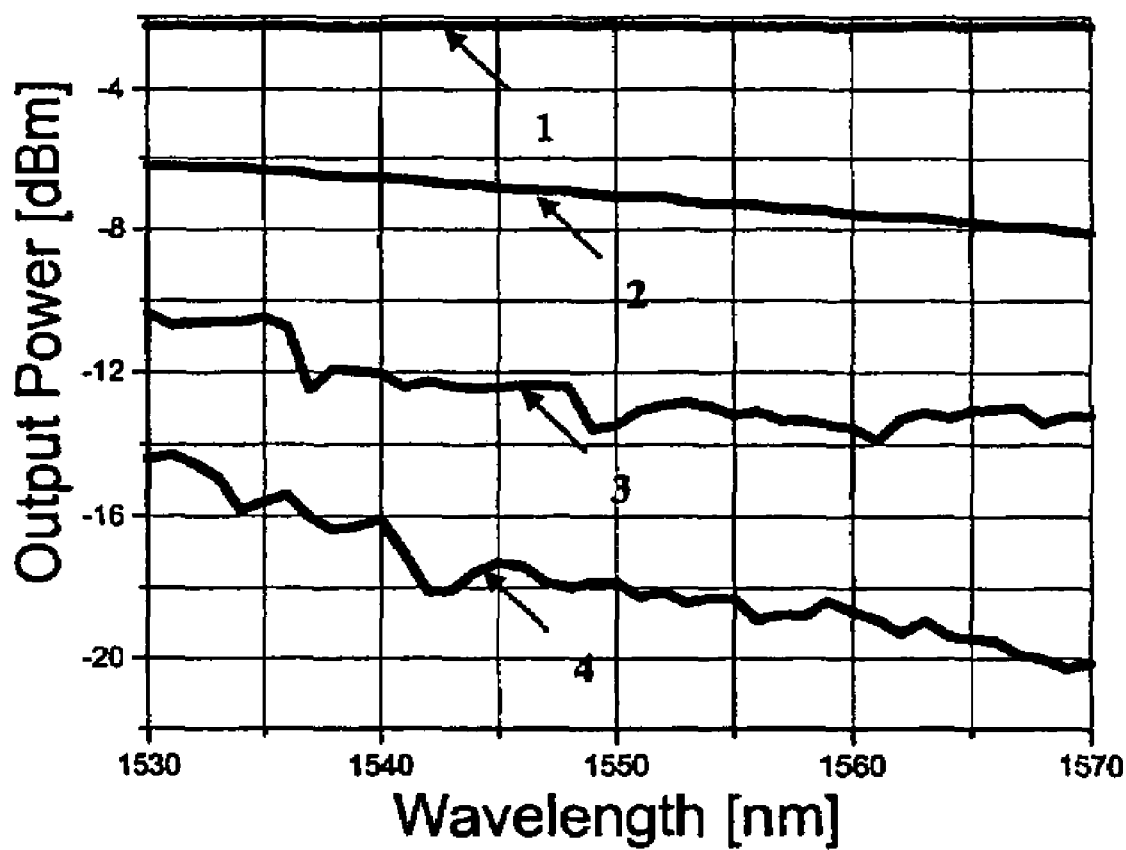
FIG. 1C (PRIOR ART), is an experimental demonstration of high wavelength dependent loss obtained in a guide with partially removed cladding that was replaced by a "pure" controllable organic material.

As it was mentioned already, the slope mismatch of refractive index dependences for an organic (for example, polymer) material $n_p$ and an optical waveguide $n_{eff}$ may bring to the creation of a significant WDL. Namely FIG. 1A (PRIOR ART) is a schematic representation of the rather flat spectral dependence of the refractive index $n_p$ of a standard commercially available fluorinated acrylate polymer (dashed line) compared to the effective refractive index $n_{eff}$ of a standard silica based waveguide (solid line). It is well known that the external control of $n_p$ (for example via the temperature of the polymer) may only vertically shift the refractive index $n_p$ without significantly changing the tilt of its spectral dependence. This may generate spectrally (or wavelength) dependent losses of propagation via light leakage. FIG. 1B (PRIOR ART) shows an experimental demonstration of such attenuation dependence upon the control parameter (here, the temperature) obtained in a SMF28 silica fiber with partially removed cladding that was replaced by a fluorinated acrylate polymer. As it may be noticed, the attenuation value starts to increase when the temperature is decreased and achieves its maximal value (the narrow minima achieving the value "−45 dB") when the $n_p(T)$ equals the core refractive index $n_{co}(T)$ of the fiber. Because of the above mentioned dispersion slope mismatch, the attenuation value at each temperature T will be different for various wavelengths generating thus a significant WDL. FIG. 1C (PRIOR ART) is an experimental demonstration of the high WDL obtained in a SMF28 silica fiber with partially removed cladding that was replaced by the fluorinated polymer. It may be easily noticed that the attenuation value, for a given temperature, is significantly higher for the longer wavelength side of the C band (ranging from 1530 nm to 1570 nm). In some commercially available polymers the difference of attenuation at extreme wavelengths of the C band (defining the WDL) may be as high as 10 dB for an attenuation value of 20 dB at 1550 nm.

Figure 1D:
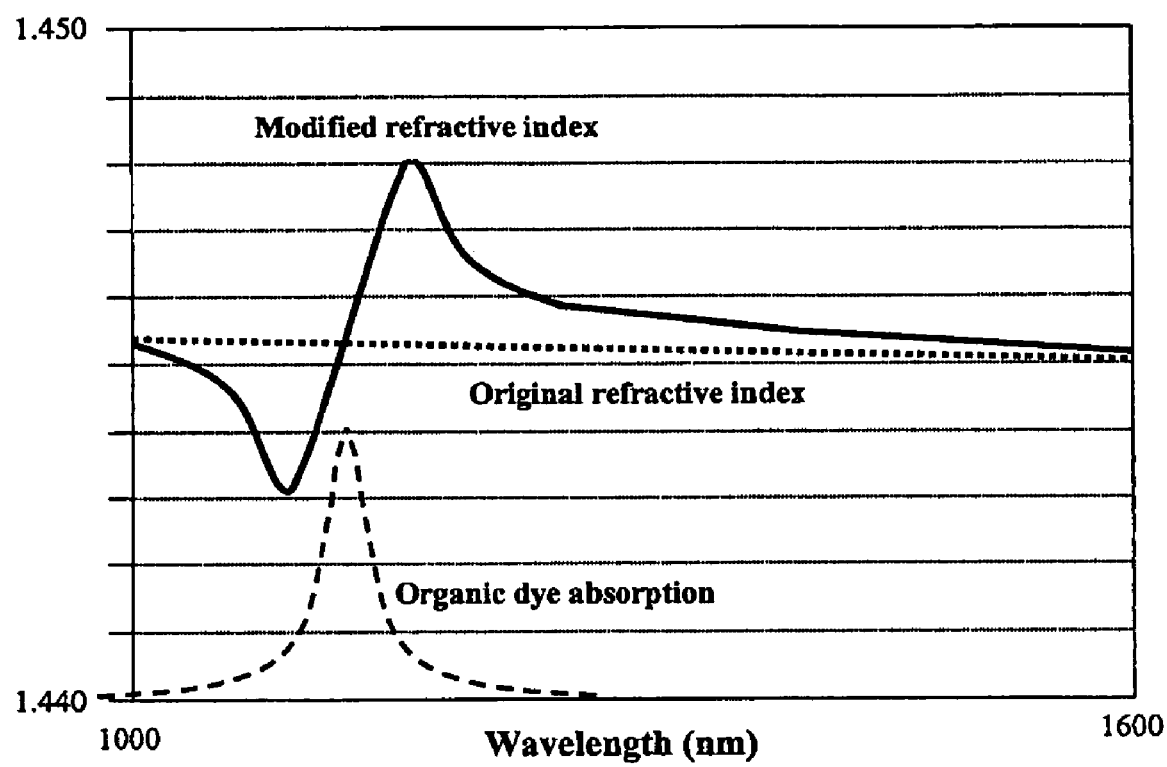
FIG. 1D (PRIOR ART), is a schematic representation of an organic dye absorption, corresponding refractive index dependences upon wavelength for an original polymer and for dispersion corrected polymer.

One of solutions of this problem, proposed in the past, consisted in introducing some specific organic dyes, which have absorption bands localized between 1100-1200 nm. As schematically illustrated in FIG. 1D (PRIOR ART), the absorption of the organic dye (dashed line) generates a corresponding dispersion (solid line). Thus, the refractive index dependence of the material system upon wavelength increases the tilt of dispersion (dotted line, FIG. 1A), providing thus a polymer system with modified ("corrected") refractive index $n^*_p$, the slope of which matches better the effective refractive index $n_{eff}$ of silica based waveguides. As we have mentioned already we believe that this is not an optimal way of solution.

In accordance with a first aspect of the present invention, there is therefore provided a method for attenuating a multi-wavelength signal in a spectrally-designed fashion. In accordance with this method, an attenuation structure is provided in interacting relationship with the light signal. The attenuation structure includes a base material system which has uniform optical properties. A plurality of non-uniformities is also provided in this base material system. These non-uniformities have optical properties different from the optical properties of the base material system, in order to generate wavelength dependent losses in the light signal.

The present invention will now be described using a VOA as an exemplary embodiment of the invention. It will readily understood by one skilled in the art that the present invention may however be used within a number of guided or free space optical components where the spectral dependency of the attenuation may be advantageously controlled, such as attenuators, light modulators, tunable couplers, Fabry-Perot interferometers, etc. More details examples of such embodiments are given below.

Figure 3A:
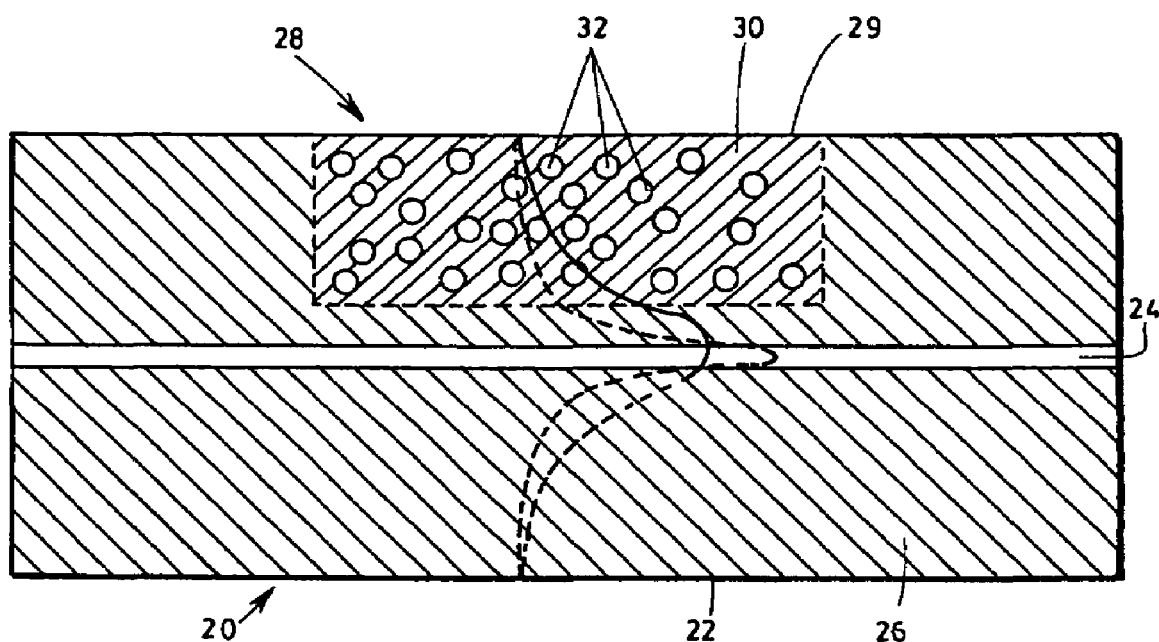
FIG. 3A, is a schematic graphical representation showing an optical waveguide with partially removed cladding, which is replaced by a composite material.

With reference to FIG. 3A, there is therefore shown an optical device 20 according to one aspect of the present invention. The device 20 includes a waveguide 22, here a length of optical fiber, which has a core 24 and a cladding 26. A portion of the cladding 26 is removed, in order to create a gap 28 of a predetermined shape. This shape may be symmetric or asymmetric with respect to the core 24, and is shown for illustrative purposes as rectangular on one side of the core 24 in the illustrated embodiment.

The gap 28 in the cladding 26 is filled with an attenuation structure 29 according to the present invention the attenuation structure includes the following main components:
  a base material system 30 of a single type or a mixture of materials of different types forming an optically uniform (in the scales compared to the wavelength of light) "host" matrix; and
  non-uniformities 32 in the base material having different optical properties so that wavelength dependent losses are generated in the light signal. The non-uniformities may be created inside the host or be embodied by particles of a given size and shape introduced therein.

These non-uniformities can be defined as at least one type of "guest" material system in the host.

Preferably, the disclosed composite mixtures have a controllable refractive index and a compositional structure that make it capable of controlling the light propagation losses. A control parameter, such as temperature, electric field, magnetic field, stress, deformation, etc may be used in this context to modify these refractive indices and other optical properties.

Before describing each element of the composite mixture, let us note that the above-mentioned invention was the result of intensive theoretical and experimental investigations. In all previously known applications, the optical uniformity of materials, used in waveguiding devices, is a requirement to avoid losses. We show here that some artificially created non-uniformity may in fact provide not only low loss but also highly desired flat spectral response of the device. This advantageously simplifies the achievement of a high technical performance (flat spectral response), robustness and cost-effectiveness of the VOA obtained in the described above way.

The materials used as host component 30 in the above-mentioned composite mixture can be selected from a considerably wide range of low refractive index polymers, gels, glasses, organic and inorganic materials. Let us note that the use of the terminology of "guest-host" systems, however should not limit us to the cases of using two distinctive materials. Thus, the disclosed composite materials may be obtained by mixing different materials as well as by creating the required differences (and optical non-uniformities) in the host itself, for example, by phase separation, aggregation, photoexposition, etc.

In cases where the optical properties of the attenuation structure are thermally controllable, the whole mixture preferably may be chosen in a way to have an average refractive index $n_{av}$ that equals the refractive index of the original waveguide's cladding $n_{cl}$ at temperatures above the maximum temperature of device's operation (e.g., 70° C. and above for telecom applications). This will allow the simple thermal control of the device's operation without using active cooling techniques. This may not be required in some cases when the material is used for tuning interferential devices.

Examples of useful materials include, but are not limited to the substances listed in the following Table 1 and their derivatives.

The host materials can be selected from the group consisting of acrylic polymers or copolymers, fluorinated polymers, silanes or siloxane copolymers, polysiloxane polymers, silicon elastomers, polyolefins, gels, UV and/or thermal curable monomers, organic or inorganic materials, etc. and their derivatives.

TABLE 1

Examples of host material composition:
Host Materials acrylic polymers or copolymers, halogenated olefins; thermal or UV-curable monomers; fluorinated polymers; polyimides; polyetherimides; polyurethanes; phenolic resins; polysiloxanes, silicon elastomers; inorganic polymers, glasses; etc.

Of course, the materials of different types, to be mixed to form a host mixture, must be selected so to be readily miscible with one another so as to form a chemically and thermally stable mixture. Preferably, this mixture is selected so as to have a minimal intrinsic absorption and have very stable optical properties. For example, the matrix must be reliable when operating as a part of a device between −5° C. and 75° C., and resist to temperature variations from −40° C. to 85° C.

The materials used as guest components 32 can also be selected from a considerably wide range of polymers, glasses, rare earth oxides, metals, various organic and inorganic materials and their derivatives (see Table 2).

TABLE 2

Examples of guest material composition: Nano and micro particles

| Inorganic | Metallic | Polymeric |
|---|---|---|
| yttrium oxide | gold | PS |
| silicon oxide powder | silver | PMMA |
| fumed silica | | melamine |
| silica microspheres | | melamine resin |
| silicon Nitride-yttrium oxide | | polytetraflouroethylen |
| borosilicate glass | | polydivinylbenzene |
| Titanium oxide (TiO$_2$) | | fluorescent polymer micro spheres |

Forms of those guest particles or zones created by them may be quite different, including but not limited to spherical, elliptical forms, etc. The sizes of the guest particles or zones may range from few nanometers to tens of micrometers.

Figure 3B:
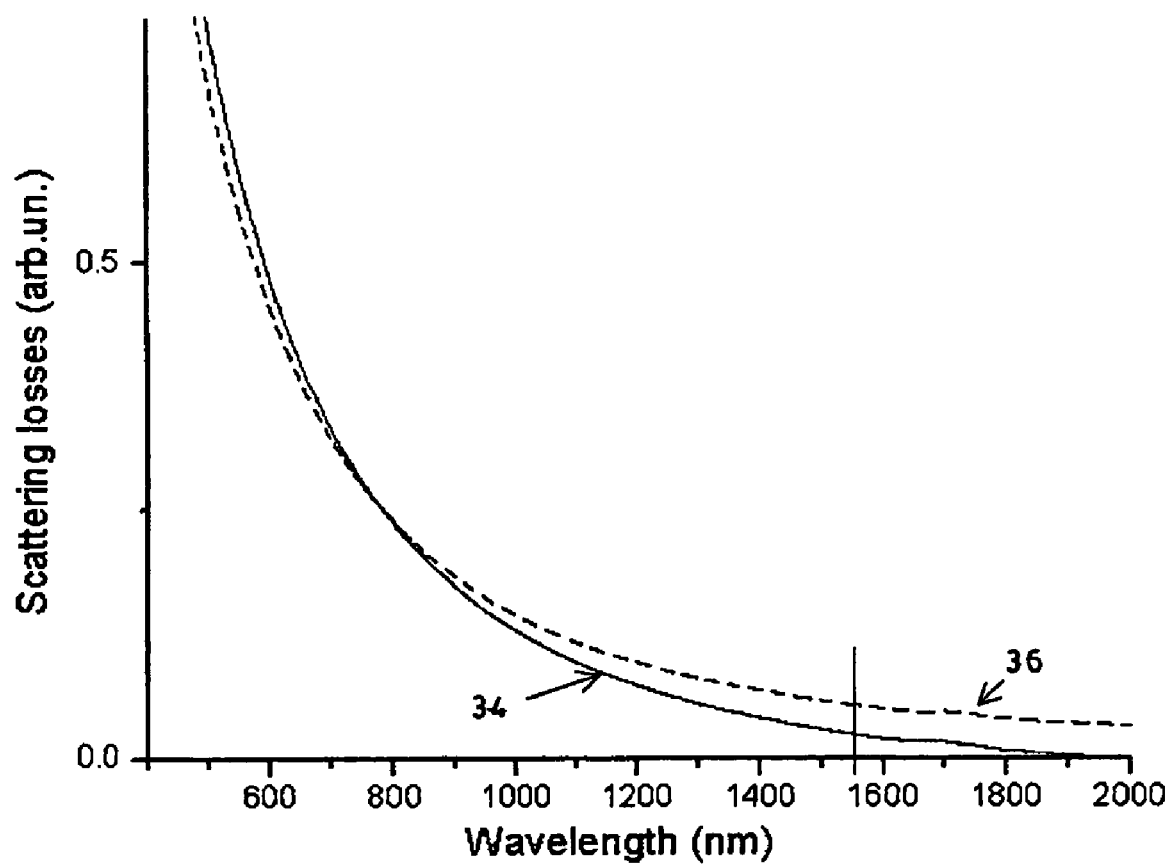
FIG. 3B, is an experimental demonstration of the dependence of scattering losses upon wavelength obtained in a composite material in the free space transmission geometry.

Depending on the nature, size, shape and distribution of the non-uniformities, different phenomena may be at the origin of the wavelength-dependent losses from the light signal. In a first example, these losses may be the result of light scattering. In such a case, the non-uniformities are preferably embodied by guest particles made from materials having a minimal effective imaginary refractive index at optical wavelengths minimizing thus the absorption of the whole material system. The real part of the refractive index $n_g$ of these particles, at a given value of the control parameter (for example, the temperature T) has a specific ratio with respect to the refractive index of the host mixture $n_h$. The appropriate choice of the particle diameters and concentration will allow the creation of the wavelength selective losses by light scattering. FIG. 3B, is an experimental demonstration of the dependence of scattering losses (both curves) upon the light wavelength obtained in a composite material (see EXAMPLE later) in the free space propagation geometry. The polymerization of this mixture brings to the formation of a stable particle suspension in the polymer matrix, which provides the wavelength selective loss (higher for shorter wavelengths) compensating the wavelength depending leakage losses of the controllable waveguide.

Figure 3C:
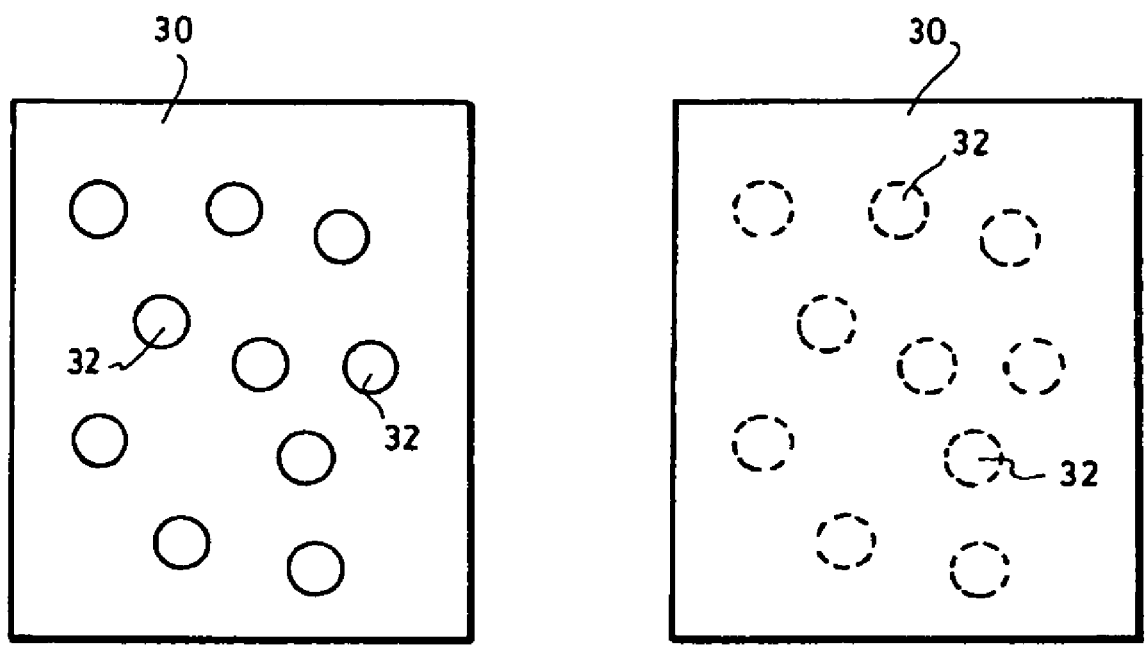
FIG. 3C, is a schematic graphical representation showing the transformation of an isotropic non-uniform media (left) into an isotropic uniform (right) media via a partial or complete "hiding" of optical non-uniformities.

In cases where the device is thermally controllable, the material compositions of the host and of the guest are preferably chosen in a way that the dependences of their refractive indices ($n_g$(T) for 5; $n_h$(T) for 10) upon the temperature have different slopes. This allows the dynamic control of the contrast of their optical properties (up to the complete "hiding") by changing the temperature T of the guest-host system. FIG. 3C, is a schematic graphical representation showing the heat induced isotropic transformation of refractive indexes of both host 30* and guest 32* materials transforming the isotropic non-uniform guest-host media (FIG. 3C, left) into an isotropic and more uniform (FIG. 3C, right) media via a partial or complete "hiding" of non-uniformity centers or zones since the contrast of optical properties of materials composing the guest and the host was reduced.

For example, it is well known that the silica glass has a refractive index with smaller absolute value of temperature dependence $dn_g/dT$ compared to typical polymer host materials ($-dn_h/dT > dn_g/dT$). The increase of the temperature of a "silica glass/fluorinated polymer" guest-host system transforms the scattering loss dependence, as shown in FIG. 3B, from the curve 34 to 36, providing thus a control means for both the value of scattering and also its wavelength dependence slope. Various methods may be used to obtain such a contrast change, for example, by mainly changing the refractive index of the host material, by mainly changing the refractive index of the guest material or by changing the refractive indices of both material systems. Let us emphasize again that the approach of the present embodiment has key differences with respect to the well-known dye absorption induced dispersion change since the proposed guest-host system is scattering light, not absorbing it.

Figure 4:
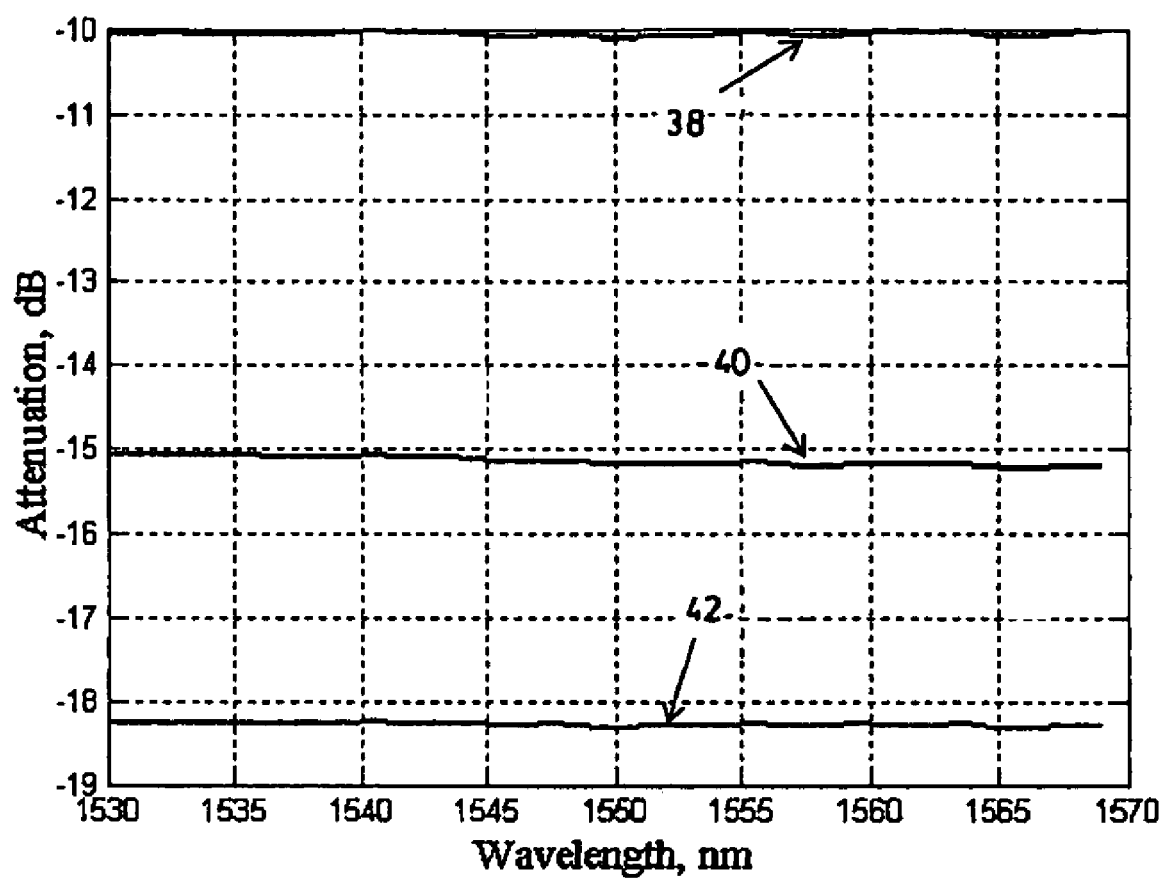
FIG. 4, is an experimental demonstration of the compensation of the WDL by using the proposed composite material as a part of fiber cladding.

FIG. 4, is an experimental demonstration of compensation of the WDL by using the composite material proposed above. The experiment has been done using a chemically etched SMF28 fiber (with above-mentioned geometrical parameters) and placing the silica/polymer guest-host material in the etched part of the cladding. The application of the electrical current (by a closely positioned electrode) changed the temperature of the material system providing thus a controllable attenuation of the guided light. It may be noticed that the addition of silica particles not only reduces significantly the WDL, but also allows the control of switching temperature, transfer function slope and keeps the value of WDL rather small at various attenuation levels (curves 38, 40 and 42, for respective attenuations 10 dB, 15.2 and 18.3 at 1550 nm).

Scattering is not the only physical interaction which can result in the wavelength-dependent losses in the present invention. In accordance with another embodiment, the non-uniformities are preferably guest particles made from materials having a non negligible imaginary refractive index. Typical examples of such materials are semiconductors, quantum dots and metals. For a concrete example here, we shall use the gold nano particles. It is well known that the absorption of a composite mixture containing, for example, a polymer host matrix and guest nano particles made of gold, may form an artificial absorption band the form of which may be controlled by the parameters of gold nano particles. The key difference of these systems with respect to previous art is the inorganic character of the guest that provides superior reliability of the mixture compared to organic dyes, which are degrading at relatively moderate temperatures. Also, while a complex chemical synthesis is required to control the absorption band's position, value and form for an organic dye, the same parameters may be much easily controlled by changing the diameter and concentration of gold nano particles. An example is the use of gold nano particles of diameters between 5 to 80 nm, which are doped into a host polymer matrix (such as fluorinated acrylate monomers). Note that such gold nano particles are commercially available with a choice of their diameters at 5 nm steps ranging from 5 to 1000 nm sizes.

The discussions above concerned generally the composition of the attenuation structure according to the present invention. In the particular case of VOAs, the geometry of the gap in the waveguide may be as important in order for the device to function properly.

There are different ways of removing the part of the waveguide's cladding. One of the well-known methods of achieving it is the one-side mechanical polishing of the fiber.

Figure 2A:
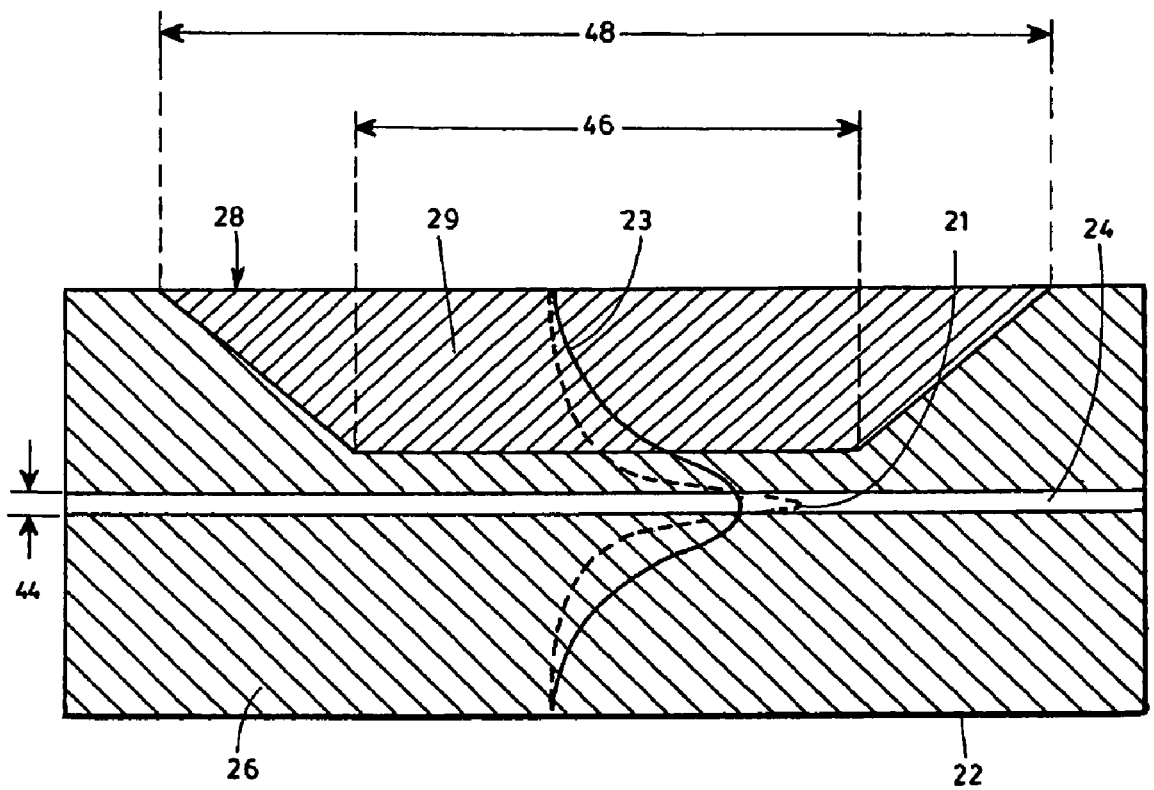
FIG. 2A, is a schematic graphical representation showing the light propagation in a guide with one-side removed cladding that is replaced by a controllable material, when the replaced cladding material's refractive index for the given wavelength matches the refractive index of the waveguide's original cladding material's one.

FIG. 2A, is a schematic graphical representation showing the light propagation in a guide with one-side removed (and replaced by a controllable material) cladding. In its initial state, the light signal 21 is guided in the core 24 of the waveguide 22. The evanescent tail 23 of this light is partially penetrating into the cladding 26 of the guide. As mentioned above, a part of the cladding 26 is removed to form a gap 28, which is filled with the attenuation structure 29. The increase of the refractive index of the attenuation structure 29 brings to the increase of evanescent field penetration depth into the cladding 26 of the waveguide, and eventually to the leakage losses of the light 21. The geometry of this removal is extremely important in many applications, the depth 44, the length 46 and the gradient (48 versus 46) of the removal being responsible for the achievable attenuation range and insertion (minimal) loss of the VOA.

Figure 2B:
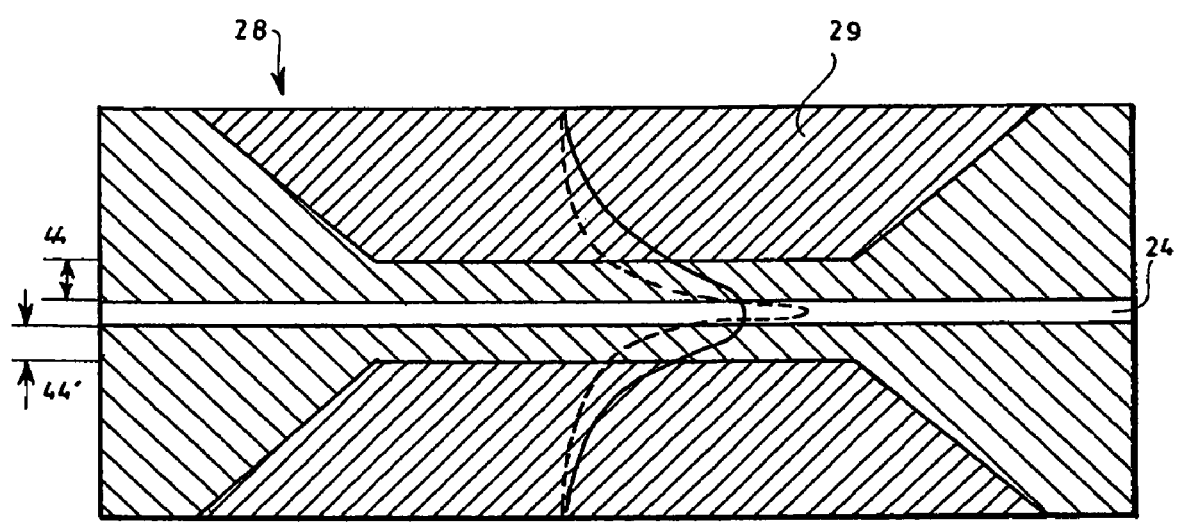
FIG. 2B, is a schematic graphical representation showing the light propagation in a guide with almost symmetrically removed cladding that is replaced by a controllable material.
Figure 2C:
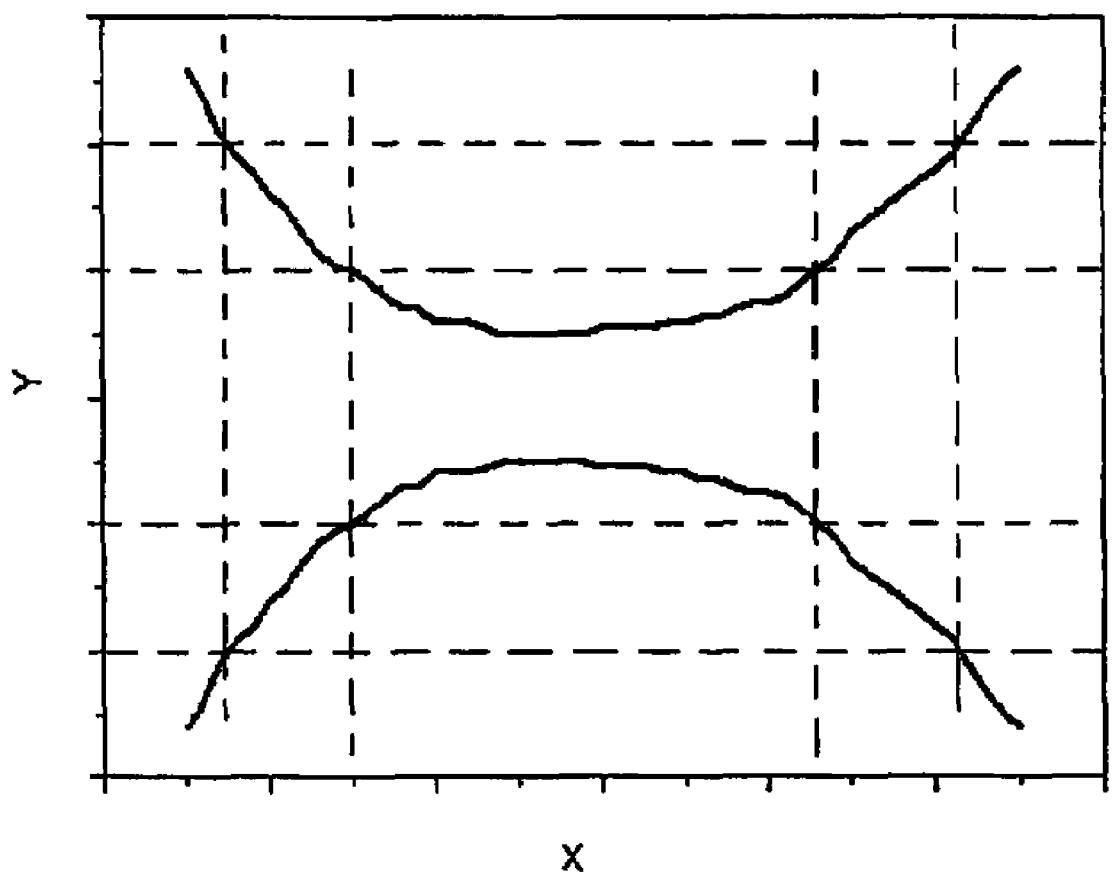
FIG. 2C, is a qualitative experimental demonstration of a chemically etched fiber's profile.

Note that the traditional way of using such a controllable waveguide is the application of a small geometrical bent to the fiber with the help of supporting blocks. In fact, such a bent is already initially imposed by these blocks when a traditional planar mechanical polishing is used. The situation may be quite different when using a straightforward waveguide with a linear axes, as for example, is the case of chemically etched or laser micro-machined fibers. Thus, FIG. 2B is a schematic graphical representation showing the light propagation in a straightforward waveguide with almost symmetrically removed (and replaced by a controllable material) cladding that was obtained by using chemical etching. The removed part 28 may then be made perfectly symmetric (when depths 44 and 44' are the same) or easily asymmetric. The obtained waveguide may bring to the guiding of the light leaked out from the core 24, bringing thus to interference phenomena (beating) between forward guided core and cladding modes. This, in turn, will generate an undesired ripple when trying to gradually change the refractive index of the attenuation structure 29 to achieve a gradual attenuation of light. Therefore, the geometrical form of waveguide etching becomes very important to control. A qualitative and non-restrictive example of such etched fiber's profile (X is along the fiber axis and Y is the transverse dimension) is presented in FIG. 2C.

Thus, in accordance with an embodiment of the present invention, there is provided a method of chemical etching of the waveguide and the obtained geometry of fiber cladding removing, along with a group of key geometrical parameters with preferable ranges of their values to achieve a high variable attenuation range, low insertion loss and smooth (without ripple) transfer function. The proposed etching (or otherwise machining) using specific geometrical chemical tanks providing

- a straightforward linear axes of the optical waveguide;
- an adiabatic transition zone providing low insertion loss of the guide; the gradient of the cladding removal (the slope of the diameter $d\rho/dz$) being in the region between 0.05-0.4, were $\rho$ is the local diameter of etched cladding and the slope z coordinates are calculated between 20 μm and 40 μm diameter etched parts.
- a sufficient removal depth to have an access to the evanescent field of the guided light by placing a controllable optical material in the removed part of the cladding; the remaining cladding thickness preferably being in the region between 0 μm and 20 μm, and even, in some cases a portion of the core may be removed too (this maximum value depending upon the used waveguide V parameter, which determines the evanescent field penetration into the cladding area for the given mode. In all cases the evanescent tail of the guided radiation must be accessible enough to provide required attenuation range for fixed etched length from each side.
- an interaction length to minimize the interference between core and cladding modes that may generate an attenuation ripple, the length of the removal being in the region between 200 μm and several millimeters.

Note, that the above-mentioned parameters are the result of intensive theoretical and experimental investigations in the particular case of VOAs. For this embodiment, any deviation from the disclosed ranges will bring to the failure of the VOA operation (due to unacceptably high insertion loss, low attenuation range, high attenuation oscillations and ripple). The embodiment disclosed above advantageously provides high technical performance and cost-effectiveness of the VOA obtained in the described above way.

Figure 5A:
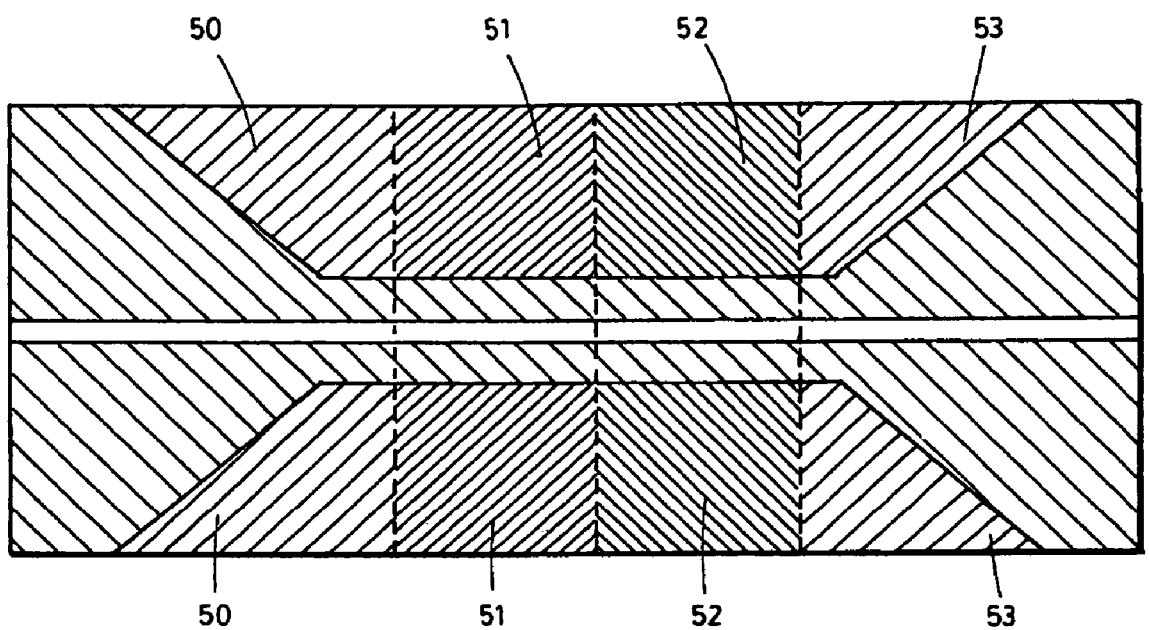
FIG. 5A, is a schematic graphical representation of effective attenuating zones providing compensation of WDL using the proposed composite material.

Referring to FIG. 5A, in another embodiment of the invention, the wavelength-dependent losses are the result of the non-uniformities defining a plurality of radial zones along the light-guiding core, each having a different effective refractive index. These non-uniformities may be obtained, for example, by adding guest particles to the host matrix or by creating the non-uniformities directly in the initially uniform mixture or by generating them by a non-uniform excitation. The role of those non-uniformities is the creation of effective zones of "artificial" cladding (replaced by the composite material) that act at different stages (or phases) with respect to the control parameter (the temperature). Thus, it was already shown (FIG. 1B) that a uniform pure controllable material would provide an attenuation transfer function with a very narrow minimum. The method disclosed here employs the non-uniformity of the composite material to provide multiple effective zones of VOA having almost similar dependence of attenuation versus temperature, but with a certain relative <<delay>> (of attenuation curves for each zone) with respect to the temperature axis. Thus, FIG. 5A, is a schematic graphical representation of four effective zones (50, 51, 52 and 53) providing the required relative <<delay>> of attenuation. Those zones and the delay (or phase shift) of their attenuation dependences upon temperature may be achieved, for example, by means of a local variation of the refractive index of the composite material (for example, $n_{50} \neq n_{51}$, $n_{51} \neq n_{52}$, $n_{52} \neq n_{53}$, etc.). A similar effect may be achieved also by means of the non-uniformity (e.g., a spatial gradient) of the heat generation, etc. The lengths of those zones ($l_1$, $l_2$, etc.) and the local gradient of non-uniformity may be controlled also to optimize the WDL value.

Figure 5B:
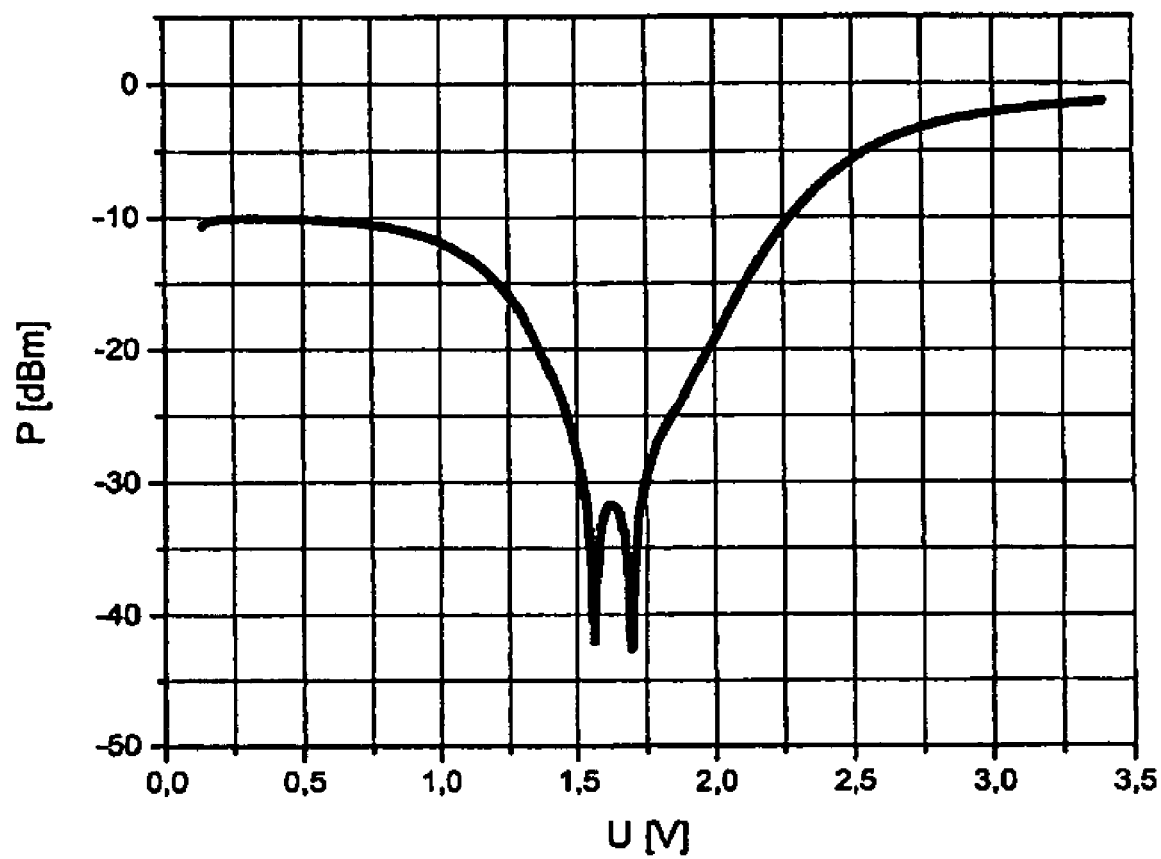
FIG. 5B, is a numerically obtained summation of attenuation values for two effective VOA zones obtained by the use of proposed composite material.
Figure 5C:
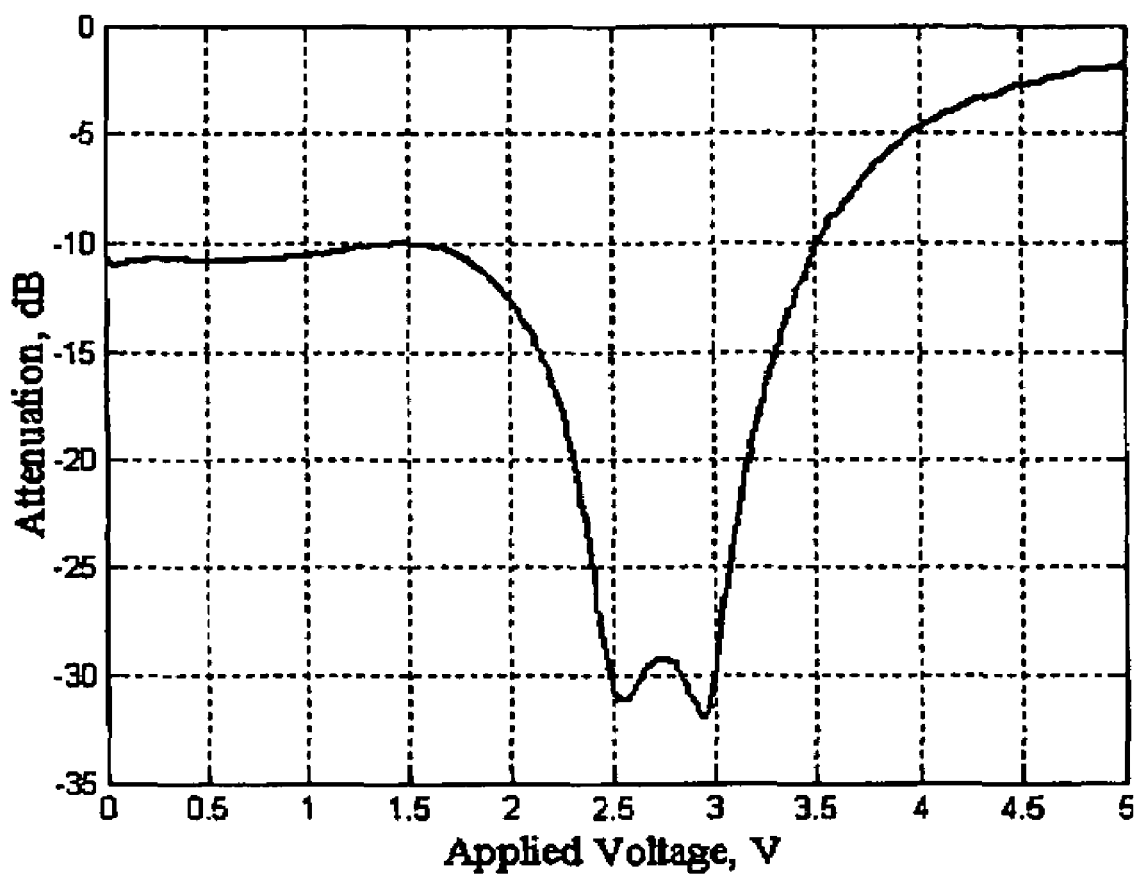
FIG. 5C, is an experimental demonstration of a variable optical attenuation transfer function obtained by the use of the proposed composite material.
Figure 5D:
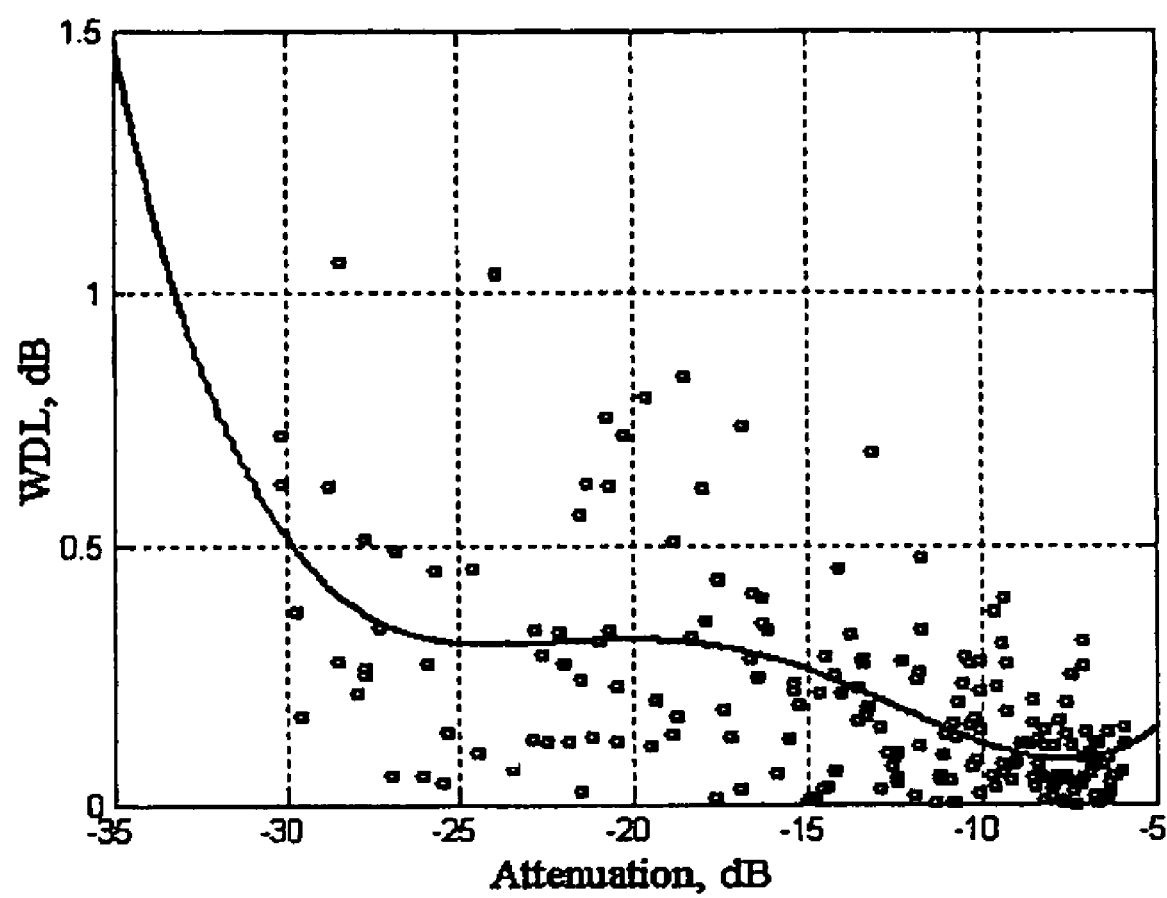
FIG. 5D, is an experimental demonstration of compensation of the WDL obtained by the use of the proposed composite material.

FIG. 5B, is a numerically obtained summation of attenuation values (versus voltage that generates the local heat) for two effective VOA zones obtained by the proposed composite material (polymer host and micro particle guest). As it can be noticed, the summation of two attenuating curves (each similar to the one represented on FIG. 1b) results in an attenuation curve, which has broader minima and smoother attenuation transfer function compared to the single VOA zone obtained by a uniform controllable cladding. As a confirmation, FIG. 5C, is an experimental demonstration of the variable optical attenuation transfer function obtained by the use of proposed composite material. FIG. 5D is the experimental demonstration of corresponding compensation of the WDL obtained by the use of the proposed composite material (see the solid line, which is the average value obtained from experimental points represented by dots). As it can be easily noticed, the wavelength dependence of this waveguide appears to be significantly less compared to the one obtained by the uniform material (FIG. 1c).

In another aspect of the present invention, the optical non-uniformities disclosed in the present invention may partially change also the dispersion characteristics of the guest-host material system, bringing it, for example, closer to the spectral dependences $n_{eff}(\lambda)$ of the guide.

Figure 5E:
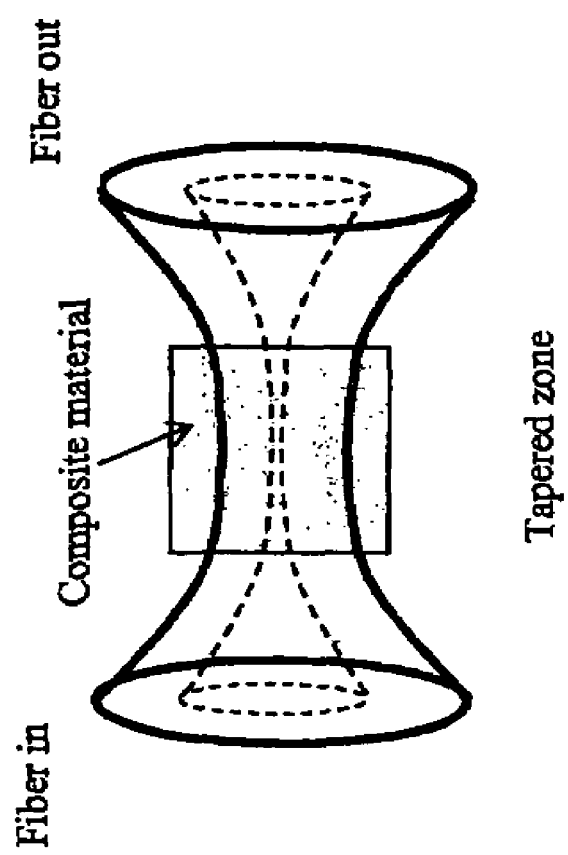
FIG. 5E, is a schematic representation of application of disclosed composite materials for controlling the spectral dependence of waveguide couplers and tapers.
Figure 5E:
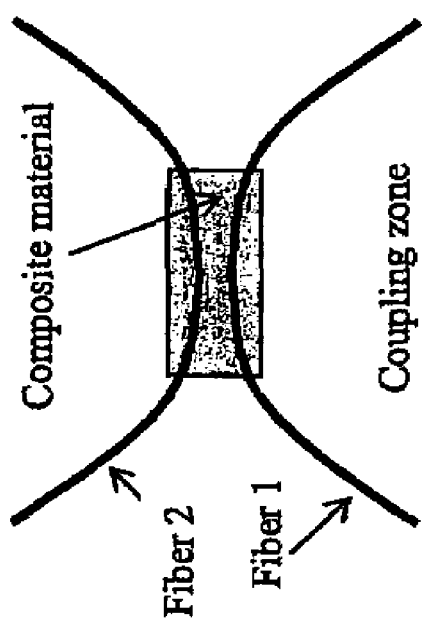

As mentioned above, the present invention may be used to control the spectral behavior of many key optical guiding devices other than VOAs. For example, an attenuation structure as described above may be introduced in between or around two or more waveguides (for example, fused or otherwise machined evanescent field couplers) or around a tapered waveguide. Thus, the left side of the FIG. 5E is a schematic representation of such evanescent field coupler (using e.g., polished half-couplers, etc.) containing the composite materials disclosed in the present invention. The right side of the FIG. 5E is a schematic representation of a tapered fiber (or fused tapered fiber coupler) portion that is surrounded by the composite materials disclosed in the present invention. It is well known that in both cases, the light propagation through those elements is wavelength sensitive. The modulation of the temperature of the composite material system disclosed in the present invention may bring to the modulation of light propagation in a spectrally predetermined way, for example, by providing optical non-uniformities and relative "delay" of responses of corresponding, artificially created, effective zones.

Figure 6A:
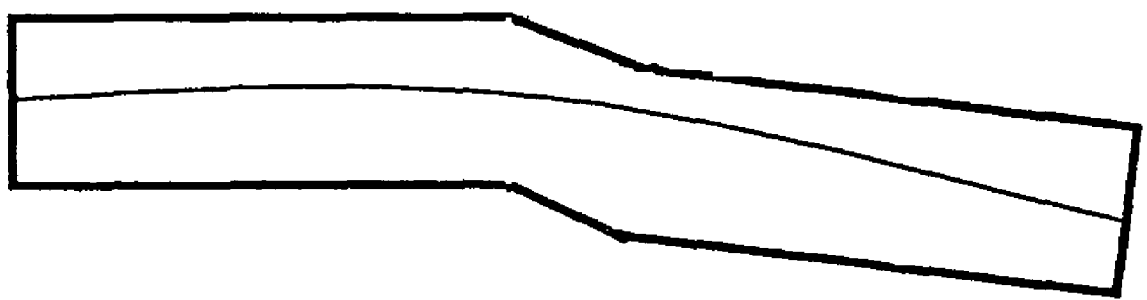
FIG. 6A, is a schematic geometrical representation of 3D deformation of the optical waveguide to compensate the WDL.
Figure 6:
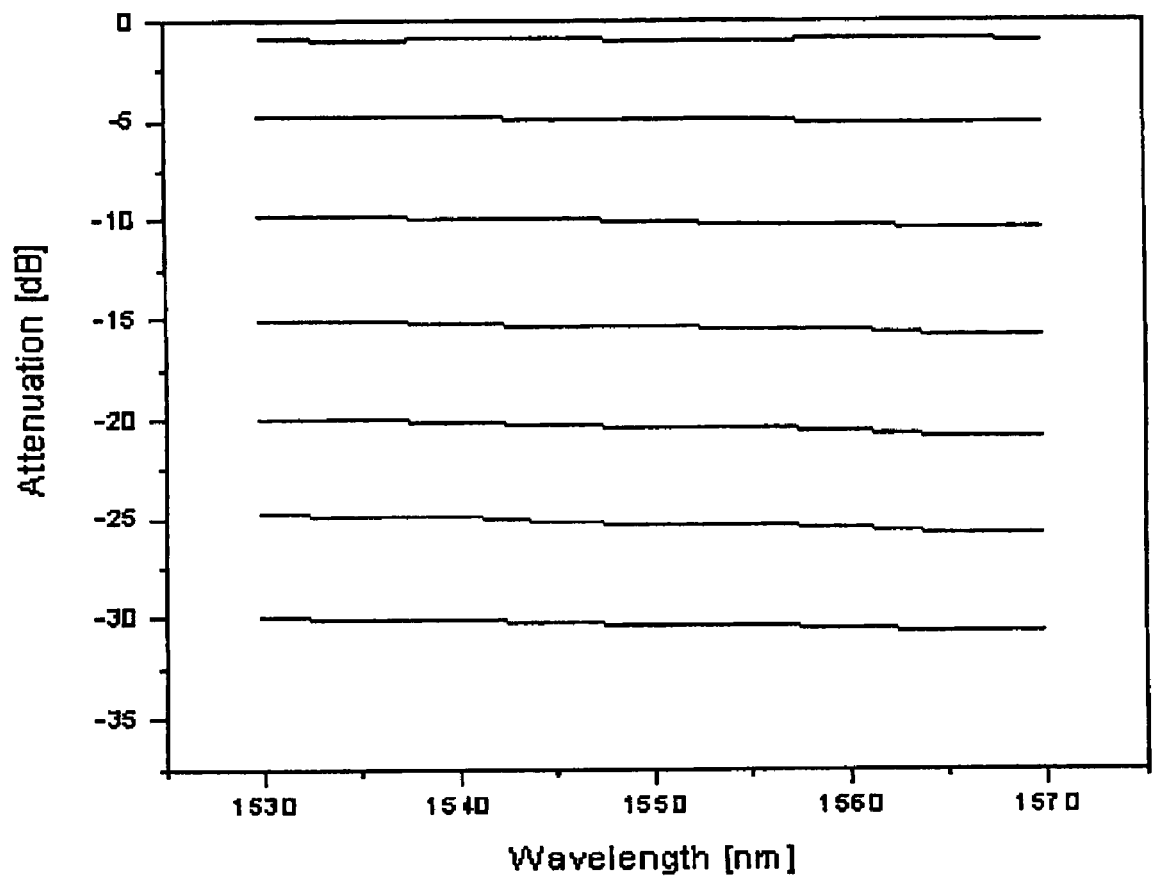
FIG. 6B, is an experimental demonstration of compensation of WDL by the use of 3D deformation of the optical waveguide.

Still in another aspect of the present invention, the WDL of the chemically etched (or otherwise micro-machined) fiber may be easily controlled by the geometrical form (a spatial bent) of the fiber. In fact, the fiber bending, according to the theory of the bent fiber, influences the guiding properties of the fiber, which, in his turn, influences the WDL magnitude of VOAs. Interference between the fundamental guided mode and ejected from the core (by the bent), so called "whispering gallery" modes, is wavelength sensitive and brings to the change of attenuation spectral dependence and can reduce it with precisely controlled fiber position. This wavelength dependence is defined by the transverse distribution of fiber refractive index, bent form (e.g., radius) as well as external material dispersion. FIG. 6A, is a schematic geometrical representation of deformation of the optical waveguide to compensate the WDL. The value of the radius of the bent curvature should be in the range of 2 mm-100 cm (depend on targeted wavelength dependence correction character).

FIG. 6B, is an experimental demonstration of compensation of WDL by the use of the disclosed above deformation (bent) of the symmetrically chemically etched SMF28 fiber. The achieved WDL here is below 0.9 dB for up to 35 dB attenuation range. In fact, one can see that the flatness of WDL remains almost the same for attenuation values ranging from 1 DB to 35 DB.

ADVANTAGES OF THE PREFERRED EMBODIMENTS OF THE INVENTION

As aforementioned, according to the present invention, the chemical etching is a very simple and cost-effective way to obtain machined waveguides (e.g., fiber) for dynamical controlling applications. Once the disclosed geometrical parameter values are respected, it can provide a low insertion loss, high attenuation range and ripple-free operation of a VOA. In addition, the disclosed composite mixtures can be used for cost-effective light modulation applications particularly well adapted for fabricating an optical signal modulation device with spectrally selective capacity. For example, the composite material may be a part of the guide's cladding where the evanescent field of the guided light propagates.

The guide itself may be also bent to provide a low WDL operation. The example below shows the results obtained by the use of one of our material compositions:

EXAMPLE 0.050 g of 1.1 micron sized polybeads polystyrene microsphere in powder form was dispersed as guest in a 1 g fluorinated polymer thermo-optic (TO) host matrix. The mixture allows to stirring at 25° C. for 2 h. The mixture was used as a cladding material for an optical fiber of partially removed cladding. The reduction of the cladding was made by a local chemical etching. The light propagating in the optical fiber, that contains the mixture as cladding, was leaking out from the core because of the high average refractive index of the composite material at room temperature. The heating of the composite material (TO material with PS microspheres) brings to a gradual increase of light transmission achieving an insertion loss below 0.2 dB. The wavelength dependent loss (WDL) of such a device appears to be greatly improved (below 0.5 dB) with respect to the case when only the original TO polymer is used without the PS microsphere.

In summary, the present invention addresses the problem of guided light's dynamic modulation in a spectrally predetermined way. New principles are disclosed for the fabrication of guiding components that allow the spectrally uniform dynamically controlled attenuation of broadband light at telecommunication wavelengths.

More specifically, first of all, the invention teaches a of composite mixtures, which may be placed in the proximity of the said waveguide's core and which comprises host matrices containing at least one additional compound having optical properties that are different from those of the host. These additional compounds may have various natures, geometrical forms and sizes and may be created, doped or otherwise introduced in the host matrices to obtain externally controllable optical properties of the whole composite material providing a broadband spectral performance. Secondly, a specific three-dimensional (3D) geometrical form of the guide is disclosed that can also provide externally controllable optical attenuation with broadband spectral performance.

Numerous modifications could be made to the embodiments above without departing from the scope of the present invention as defined in the appended claims.

The invention claimed is:

1. An optical device providing a spectrally-designed attenuation of a multi-wavelength light signal, said device comprising:
   an optical waveguide having a light-guiding core for guiding said light signal and a cladding, a gap of predetermined shape being provided in said cladding along a portion of said waveguide; and
   an attenuation structure provided within said gap, said attenuation structure comprising:
   a base material system having uniform optical properties; and
   a plurality of non-uniformities suspended in said base material system, said non-uniformities having a size of at least 5 nm and optical properties different from the optical properties of said base material system, said different optical properties of the base material system and non-uniformities generating wavelength dependent losses in said light signal.

2. The optical device according to claim 1, wherein said optical waveguide is an optical fiber.

3. The optical device according to claim 1, wherein said predetermined shape of the gap is symmetric with respect to said light-guiding core, said predetermined shape having a longitudinal cross-section defined by: opposite transition zones having identical slopes; and a flat interaction zone therebetween.

4. The optical device according to claim 3, wherein said slope of the transition zones is selected between 0.05 and 0.4, each of said transition zones having a length along said core of between 20 and 40 µm.

5. The optical device according to claim 4, wherein said interaction zone is disposed at a radial distance of said core selected between 0 µm and 40 m, said interaction zone having a length along said core greater than 200 µm.

6. The optical device according to claim 1, wherein said base material system comprises at least one material selected from the group consisting of acrylic polymers and copolymers, fluorinated polymers, silanes and siloxane copolymers, polysiloxane polymers, silicon elastomers, polyolefins, gels, UV curable monomers, thermal curable monomers, organic material, inorganic materials and their derivatives.

7. The optical device according to claim 1, wherein said base material system comprises miscible materials of different types forming together a thermally stable mixture.

8. The optical device according to claim 1, wherein said non-uniformities comprise regions of said base material system transformed by a process selected from the group consisting of phase separation, aggregation and photoexposition.

9. The optical device according to claim 1, wherein said non-uniformities include guest particles of a composition different from said base material system.

10. The optical device according to claim 9, wherein said guest particles are evenly distributed throughout said base material system.

11. The optical device according to claim 9, wherein said guest particles are selected from the group consisting of polymers, glasses, rare earth oxides, metals, organic and inorganic materials and their derivatives.

12. The optical device according to claim 1, wherein said optical properties of the base material system and non-uniformities are selected so that said wavelength-dependent losses are generated by scattering.

13. The optical device according to claim 12, wherein: the optical properties of said base material system comprise an effective refractive index $n_h$; and the optical properties of said non-uniformities comprise an effective refractive index $n_g$ different from $n_h$ and having a real part and an imaginary part, said imaginary part being negligible compared to said real part.

14. The optical device according to claim 13, wherein said wavelength dependent losses in said light signal are controllable by a control parameter, and said effective refractive indices of the base material system and of the non-uniformities vary differently as a function of said control parameter.

15. The optical device according to claim 1, wherein said optical properties of the base material system and of the non-uniformities are selected to create absorption bands generating said wavelength-dependent losses.

16. The optical device according to claim 15, wherein said non-uniformities includes guest particles, the optical properties of said guest particles comprising an effective refractive index $n_g$ having a real part and an imaginary part, said imaginary part being non-negligible compared to said real part.

17. The optical device according to claim 16, wherein said guest particles are selected from the group consisting of semiconductors, quantum dots and metals.

18. The optical device according to claim 1, wherein said wavelength dependent losses in said light signal are controllable by a control parameter.

19. The optical device according to claim 18, wherein said control parameter is a temperature of said attenuation structure.

20. The optical device according to claim 19, wherein said attenuation structure has an average refractive index substantially equal to a refractive index of said cladding for temperature values above a predetermined operation range of temperature for said device.

21. The optical device according to claim 1, wherein non-uniformities in said attenuation structure define a plurality of radial zones along said light-guiding core, each having a different effective refractive index.

22. The optical device according to claim 1, wherein the optical properties of said non-uniformities are selected so that said attenuation structure has dispersion characteristics substantially matching dispersion characteristics of the waveguide.

23. The optical device according to claim 1, wherein said wavelength dependent losses are higher for shorter wavelengths of said light signal.

24. A method for attenuating a multi-wavelength signal in a spectrally-designed fashion, comprising the step of providing an attenuation structure in an interacting relationship with said light signal, said attenuation structure comprising:
a base material system having uniform optical properties; and
a plurality of non-uniformities suspended in said base material system, said non-uniformities having a size of at least 5 nm and optical properties different from the optical properties of said base material system, said different optical properties of the base material system and non-uniformities generating wavelength dependent losses in said light signal.

25. The method according to claim 24, further comprising a step of guiding said light signal in a core of a waveguide.

26. The method according to claim 25, wherein said attenuation structure is provided around said waveguide.

27. The method according to claim 25, further comprising a step of removing a portion of said waveguide, thereby creating a gap of predetermined shape therein, said attenuation structure being provided within said gap.

28. The method according to claim 24, further comprising a step of applying a control excitation to said attenuation structure, said control excitation controlling the wavelength dependent losses in said attenuation structure.

29. The method according to claim 28, wherein said step of applying a control excitation comprises controlling a temperature within said attenuation structure.

* * * * *